United States Patent [19]

Rosenfield

[11] Patent Number: 5,439,584
[45] Date of Patent: Aug. 8, 1995

[54] SYSTEM FOR REDUCING CONSUMPTION OF FRESH WATER AND ENERGY COSTS USED IN A PHOTOFINISHING OPERATION

[76] Inventor: Gerson J. Rosenfield, 27 High Pasture Rd., Kittery Point, Me. 03905

[21] Appl. No.: 891,428

[22] Filed: May 29, 1992

[51] Int. Cl.⁶ .............................................. C02F 9/00
[52] U.S. Cl. .................................... 210/136; 210/97; 210/167; 210/202; 210/241; 210/251; 210/257.1; 210/259; 210/266; 210/912
[58] Field of Search .......................... 210/97, 167, 195.1, 210/202, 251, 258, 259, 266, 416.1, 900, 136, 241, 138, 257.1, 912; 354/324

[56] References Cited

U.S. PATENT DOCUMENTS

| | | | |
|---|---|---|---|
| 3,870,033 | 3/1975 | Faylor et al. | 210/900 |
| 4,160,594 | 7/1979 | Geyken et al. | 354/324 |
| 4,800,005 | 1/1989 | Rosenfield et al. | 204/109 |
| 4,857,950 | 8/1989 | Takase et al. | 354/324 |

Primary Examiner—Ivars Cintins
Attorney, Agent, or Firm—Herbert L. Gatewood

[57] ABSTRACT

Apparatus combination and system for reducing use of fresh water in a photoprocessing operation by recirculation of the wash water to the photoprocessing operation via a silver recovery system. Wash water is periodically discharged to waste and a like amount of fresh water is added to the system which serves to reduce the concentration of thiosulfate ions in the wash water.

19 Claims, 3 Drawing Sheets

SYSTEM FOR REDUCING CONSUMPTION OF FRESH WATER AND ENERGY COSTS USED IN A PHOTOFINISHING OPERATION

BACKGROUND OF THE INVENTION

1. Field of the Invention

This invention relates, in general, to a photofinishing operation. More particularly, it relates to a system and apparatus for reducing the amount of fresh water used in the processing of photographic film and to the reduction in energy costs saved by not having to heat that amount of water. Further, the invention relates to apparatus means and a process for extracting silver from photofinishing wash water solutions on a recirculation basis and for controlling biological growth in the recirculated wash waters.

2. Description of the Prior Art

In the processing of photographic films and papers, there are three processing solutions—the developer, the fix or hypo, and the wash bath. The first develops the image and no silver is removed from the film or paper. The fix or thiosulfate bath converts the unexposed silver halides to silver metal and dissolves the exposed areas into the fix solution. The film or paper is then transported (most often in automatic film processors) via rollers to the wash bath. The wash bath functions to "wash-off" the residual silver thiosulfate and thiosulfate remaining on the film or paper surface.

Various silver salts employed in the manufacture of photographic paper and film go into solution in the various aqueous fix or hypo solutions. These spent processing solutions contain a relatively large concentration of silver and are, in general, processed to remove as much of the silver therefrom as possible. The need to remove an even greater amount of silver from these spent photo fix solutions, due to environmental regulations, among other considerations, has prompted considerable research and development efforts, to provide more effective recovery systems. One such an effort is disclosed in U.S. Pat. No. 4,800,005, which issued to me on Jan. 24, 1989.

Although the novel electrolytic unit disclosed in U.S. Pat. No. 4,800,005 is quite successful in the recovery of silver from a spent hypo solution, such a system and apparatus does not work well in the recovery of silver from wash or rinse water effluent from the photofinishing operations. This wash water, like the fix solution, contains dissolved thiosulfate ions, and ions of silver thiosulfate. One reason for this ineffective removal is the relatively low or dilute concentration of silver thiosulfate ions in those solutions compared, for example, to the concentration of silver thiosulfate in the spent fix solutions.

Photoprocessing of film can use several hundred or thousand gallons of fresh, heated (to about 72 degrees F.) water per day. With presently, and ever increasingly expensive water and sewer rates, a lesser consumption of fresh water could mean a real and substantial dollar savings to a film processor. Further, additional savings could be realized through less energy costs as a lesser amount of water is heated.

Until the somewhat more recent past, these wash water solutions were commonly discharged into a connected sewer system, or otherwise to the environment, e.g., into a stream. In cases, i.e., where the film processor might be on a septic system, the wash water solutions were collected in suitable containers and later hauled away for disposal. More recently, however, there has been an ever increasing concern about the discharge of such hazardous waste material, e.g. waste containing heavy metals, as does the photofinishing wash water, into the environment, due to various local, state and federal regulations. Further, the Environmental Protection Agency ("EPA") has recently found that silver when linked with copper (found in almost all water discharges) forms a compound very hazardous to marine life. This copper/silver bonding has resulted in California and Nevada banning all silver discharges into Lake Tahoe. Of concern also in some areas of the country, in addition to environmental regulations, water consumption is actually being restricted. Accordingly, there is a real need, particularly in the wash water solutions in photo processing operations to reduce the consumption of fresh or city water.

Heretofore, others have been concerned with at least certain of these various problems in photofinishing operations. Nevertheless, the primary concern has been mostly in reducing the amount of silver in the wash water solutions. This is so that such solutions would meet the various regulations for disposal of hazardous waste and such could then be discharged directly to the environment.

The recovery of silver by ion exchange has not long been practiced. Its application to the photographic industry has been prompted in relatively recent years, primarily due to three factors, i.e., economic situations have made it profitable for laboratories to recover silver from dilute wash water solutions, conservation of a valuable natural resource, i.e., water; and compliance with increasingly stringent discharge effluent regulations by various government bodies, as earlier alluded to, e.g. the EPA and regional waste treatment plants. Even so, however, little attention has been given to such problems encountered by the relatively small scale users in the whole of the photographic sector, e.g., in particular, in the medical x-rays and graphic arts (e.g., newspapers and printers) areas, relative to somewhat larger users of even higher volumes of water in the processing of photographic film, e.g., the processing of black-and-white and color print film and color slide film.

Others prior to the invention disclosed herein have considered the recycling or recirculation of the wash water solutions from photofinishing operations. In one such an operation, wash water is merely recycled to the photofinishing operations for use again without any concern about the recovery of silver. Although there is consumed less fresh water in such a system and there is a savings in energy costs as well, the recycling of untreated wash water in such a manner to the photofinishing operation is attendant with certain problems. One particular problem involves the build-up of bacteria slimes in the collection or holding tank for the wash water which is to be recycled. Even of more concern is the build-up of bacteria slimes in the photofinishing apparatus. This necessitates shut-down of the processing and cleaning the apparatus involved.

A solution is now classified as hazardous waste when it contains over 5 parts per million ("ppm") silver. When photo wash waters are not recycled or recirculated as indicated earlier, they, in general, most often contain less than 2.0 ppm silver, which is just within the discharge limits established to date by many municipal waste treatment plants. Nevertheless, an untreated recycled wash water solution, i.e., one wherein there is no concern about silver recovery, may contain as much as 200–3,000 ppm silver. As a result, there is much reluctance on the part of photofinishers merely to purchase a recirculation system because the water and heat savings are offset by hazardous waste removal expenses and other regulatory requirements.

In another recirculation system of which I am aware, that system does involve the recovery of silver. Nevertheless, in this system the wash water is recycled until such time that the concentration of silver is sufficient to make it practical and economical for recovery. The silver is then recovered from any such silver concentrated wash water that is to be discharged from the system to waste, to meet the hazardous waste requirements established by any federal, state and local requirements. These systems employ either steel wool or ion exchange resins to remove the silver before discharge to the sewer. There are several problems peculiar to such a recirculation and silver recovery system. For example, (1). Large quantities of steel wool or ion exchange resins are needed to treat a "surge" discharge of the recycled wash water; (2). This effluent is often recirculated a week or more, thus it can contain large concentrations of thiosulfate and silver thiosulfate ions. Ion exchange resins, in particular, have difficulty holding on to the silver thiosulfate ions when so many other free thiosulfate ions are present. Thus many milligrams of silver could be inadvertently and illegally released to the sewer; and (3). Between the small ion exchange resin beads is space for the liquid (wash water) to flow. With the presence of low level thiosulfate, warmth, and darkness, biological growth often explodes exponentially—resulting in clogged resin columns and resin too fouled to recover silver.

Another photo wash water circulation system of which I am aware involves the recovery of silver by means of ion exchange. Nevertheless, this system requires on-site, periodic regeneration of the ion exchange resins to prepare the sites on the ion-exchange resin for additional silver recovery. Thus, with use of such a system one must also purchase a regeneration unit. Although such units are built for use by so-called "minilabs," there are certain disadvantages in their use. The regenerator, though relatively small and portable, nevertheless takes up some floor space, space that is valuable and not always available in a small scale photofinishing operation. Moreover, such regeneration units commonly involve the use of sulfuric acid which is not only of some concern in handling and use, because such is a strong acid and very corrosive, but also can be quite odoriferous. Also, these systems must be "backflushed" to wash out the build-up of biogrowth and impurities found in the wash waters. Backwashing often is a daily practice resulting in the shut down of the processors, thus stopping film processing. Further, when backwashing or regeneration must be done, there is the high probability of washing silver down the drain in the process. This can result in illegally dumping silver into the waste stream or environment.

In a further system now being used, and involving silver recovery as well as recirculation of wash water, the wash water rinses or solutions are collected in a tank and then passed through ion exchange units for recovering the silver. This system involves periodic backwashing of the bed of ion exchange resin to remove emulsion gelatin and prevent clogging. This is accomplished by the reverse flow of city water through the resin containing bottles or tanks taken out of service momentarily for this purpose while another silver extraction ion resin column is substituted in its place. In addition to such periodic backwashing of the ion exchange column, a column loaded with silver is removed (with substitution of a regenerated resin column in its place) from the system and regenerated. Silver removed from the ion exchange resin is then recovered from the regeneration solution electrolytically. Following the removal of silver, the wash water solution effluent is brominated to prevent growth of bacterial slime or algae and to oxidize any remaining fix. It then is passed to a distribution tank whereat city make-up water will be added to the wash water solution if processor demand should exceed recycling capacity. Water from the distribution tank can be recycled to any of the originating washes following, according to the manufacturer, a small increase in temperature and approximately 10% dilution with fresh water to prevent a build-up of chemical salts.

Such a system suffers many of the disadvantages described earlier, e.g. surge discharges, large build-up of thiosulfate ions from too much recirculation, clogged resin columns needing back flushing, and biogrowth. Furthermore, it has been discovered that chloride or bromide tablets which some companies sell to control biogrowth are ineffective because the acetic acid found in fix solutions has been found to neutralize them.

A further disadvantage with the just mentioned system is its cost. This system is easily 2–3 times the size of the film processor. It requires in some states such as Massachusetts and Rhode Island that the operator become licensed as a waste treatment plant operator.

As to biogrowth problems, ultraviolet light has also proved to be ineffective, apparently, because the UV light can only penetrate a very small surface and the water must be flowing past it 24 hours a day. Further, ultraviolet light glass tubes which come in contact with the wash water quickly become plated with silver halide as such reacts with the exposure to the UV light.

Ozone, a strong oxidizer, was also found to be ineffective on biogrowth. The ozone generated not only did not control growth but too much ozone in a darkroom can make people ill. Moreover, the ozone caused the wash water to turn ink black. Once the ozone was turned off, the biological growth increased rapidly.

Thus, there is still a need by the photoprocessor for a system that is not only economical in cost but one which is efficient in silver recovery and which reduces water consumption significantly with no hazardous waste by-product as a consequence. And there is a need that such a system operate to inhibit biogrowth not only in the wash water collection tank but throughout the system. This need is particularly great by the small scale operator.

Photoprocessing is practiced by graphic arts operations—printers, newspapers, typesetters; x-ray operators—medical x-ray, industrial x-ray; photographers—photofinishing, motion pictures, aerial, testing, etc. and microfilming. All these areas of photoprocessing are now subject to low silver discharge limits. Thus, in some geographical areas a small scale operator may be the local newspaper. In other areas such as Long Island, N.Y. or Cape Cod, Mass., the local dentist or chiropractor may be the photoprocessor that must treat such waste.

The above needs for treatment of photoprocessing wash water can arise in a number of different ways, e.g., as a result of:

(1). locally mandated regulations and restrictions on water usage (e.g., California, Florida, and Long Island, N.Y.);

(2). a photoprocessor's desire or need to control water related costs, e.g., the rising use and discharge fees, and energy costs relating to the heating of wash water;

(3). a photoprocessor's need to comply with environmental discharge regulations, in some cases, in concentrations as low as parts per billion; and (4). a photoprocessor's desire or need to control waste disposal costs—if the waste water is hauled for disposal or sent out for post treatment the resulting expense directly impacts competitiveness and profits.

Also there is need by the photographic film manufacturers to demonstrate to their small and medium size customers that film based technology is environmentally and economically cost competitive with the newly emerging electronic publishing.

SUMMARY OF THE INVENTION

A primary object of the present invention is to provide a system for not only the recovery of silver from photo wash water solutions but one in which the wash water can be recirculated to the photoprocessing operations, not attendant with the problems of presently used recirculation systems.

Another object of the invention is to provide a system involving a unique combination of apparatus components wherein the use of such can result in a significant reduction of fresh water consumed in a photoprocessing operation.

A further object of the invention is to provide a system and apparatus whereby the silver concentration in recirculated wash water in a photoprocessing operation is reduced to such an extent that no hazardous waste by-product results.

Another object of the present invention is to provide an apparatus and system where such will operate automatically without need for any extensive training in its use and no requirement for daily maintenance.

Another object is to provide a recirculation system for photoprocessing wash water and apparatus for treatment of same relatively simple in operation and economical in cost, making such more suitable for use by small scale photoprocessors such as earlier disclosed.

Another object of the invention is to provide a wash water recirculation system wherein silver is recovered by ion exchange resin means but which requires no on-site regeneration for the resin by the photoprocessor.

Another object of the invention is to provide a wash water recirculation system wherein biological growth commonly associated with photo wash waters is controlled and inhibited automatically, resulting in keeping the film processor rollers and racks cleaner for a longer time.

Another object of the invention is to provide a recirculation system whereby the wash water recirculated is of good quality.

Quite advantageously, the apparatus of this invention and the unique process for recirculation of wash water back to the photo processing or finishing operation can provide a substantial economic savings—save incoming fresh water costs, saves municipal waste water sewage fees, saves heating water costs, and saves on wash water additives. Wash water additives commonly used at present time are biocides that are very diluted, resulting in the manufacturer making relatively large profits. Typically, a photoprocessor will need add 2½ gallons of such additives manually to the wash water recirculator each week. This can result, in general, in a cost of from $25–$35 each week ($1300–$1900 per year). The concentrated biocide used in the silver recovery recirculation system disclosed herein, by comparison, costs only $300/yr. for 5 gallons.

Another advantage of the system disclosed herein is that it reduces film processor down time for cleaning of racks and processing equipment. This is because the biocide used in the system and its manner of use stops biological growth from starting. Bioslimes, another type growth, does not have a chance to develop in the processor as well. With the wash water additives now used, the biogrowth is just controlled to some extent, not stopped. Furthermore, this invention eliminates hazardous waste hauling fees. No on or off regeneration of the ion exchange column is required and there is no time consuming back-flushing need of those columns in this invention. There is also, advantageously, a further dollar savings in costs related to waterheaters and their maintenance, as well as in fresh water filters. Such equipment although used in this invention is needed to be used much less in the wash water recirculation system disclosed herein. For example, instead of handling 4000 gallons of water each day, as some photoprocessing systems now do only 40 gals./day may be used. Thus, there is less wear and tear, so-to-speak, with the system and apparatus of this invention.

Another advantage of the apparatus used in the wash water recirculation system disclosed herein is that such is relatively compact having a very small foot print, taking up only a small amount of valuable space in the darkroom. The size of the apparatus combination of the present invention occupies a space only 20 ½ inches wide ×22 inches long ×22 inches high. Thus, while such a unit is ideal for a small or minilab photoprocessor, e.g. a small town newspaper, it is not so limited. A major printer could also benefit from use of the apparatus system of this invention.

Quite advantageously, with the silver recovery recirculation system and apparatus of this invention, there is no requirement that the operator of the system become licensed as a waste treatment plant operator such as now required in Massachusetts and Rhode Island. This results from the fact that the silver containing wash water is hard piped to one photofilm processor and the silver is removed prior to leaving this film processor, as will become more clear hereinafter. As such, the apparatus is considered an integral part of the film processor and is not regulated. This fact can be very important to a photoprocessor in considering the purchase of equipment for recovery of silver from wash water. Systems now being used for such purposes start at about $25,000 and readily go to $150,000 for one able to handle 4 or more film processors.

BRIEF DESCRIPTION OF THE DRAWING

The novel features and operation of the system and apparatus of the invention will be better understood by reference to the drawing, in conjunction with reading the following specification, in which.

DETAILED DESCRIPTION OF THE INVENTION AND THE PREFERRED EMBODIMENT

Figure 1:
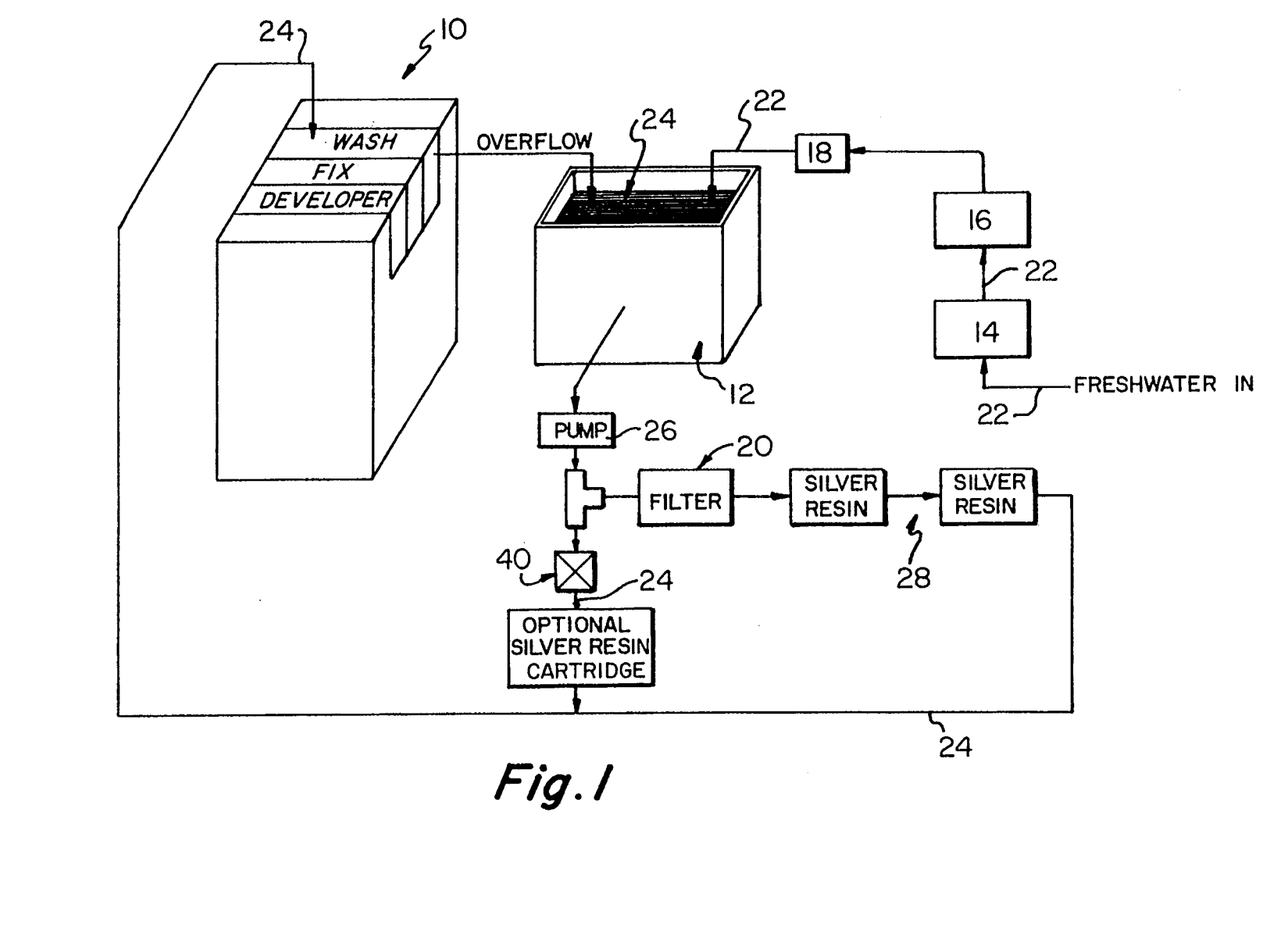
FIG. 1 is a block diagram showing the flow of the wash or rinse water from a photofinishing operation through silver recovery and recirculation back to the photofinishing operation with addition of a predetermined amount of fresh water periodically to the wash water solution and discharge of a like amount of silver containing wash water to waste.

Referring now to the drawings, there is disclosed in FIG. 1 thereof a block diagram showing schematically the silver recovery and recirculation system of the invention. As shown, in general, the system processes the wash water from a photoprocessing operation and returns it to that operation for re-use in the various washing or rinsing cycles involved.

As shown by FIG. 1, wash water from the photofinishing operation denoted generally by reference numeral 10 overflows to a collection tank 12 wherein a predetermined amount of fresh water, e.g., city water, is added to the collection tank 12 at periodic intervals. With periodic addition of fresh water to the wash water, the thiosulfate ion level in the wash water can be maintained at a desired level. As will be readily appreciated, the greater the amount of fresh water added, the lower, in general, will be the concentration of thiosulfate ions. The thiosulfate level is to be maintained relatively low, as hereinafter more fully disclosed, whereby the silver recovery units, i.e., ion exchange resin beds, can perform more effectively. It has been discovered that with a system such as disclosed herein, in general, the addition of fresh water 1–4 times daily will be satisfactory in maintaining a suitably low level of thiosulfate. Nevertheless, as will be appreciated by those in the art, the number of times that fresh water is added and the amount each time will depend to some extent upon the concentration of such ions in the wash water initially, i.e., the overflow from the photofinishing operation and the size collection tank."

An additional advantage in periodically adding fresh water to the wash water in the collection tank is that the general quality of the wash water is,improved. This is reflected in the photofinishing operation in that less streaking on the film occurs, particularly in graphic arts applications. Thus, less touch up of such processed film is required.

The incoming fresh water, as shown in FIG. 1, in some cases must be provided at 72 degrees F (heater not shown). Thus, it will be appreciated that the invention can include in one embodiment thereof a conventional water heater. This fresh water is first passed to a filter 14 whereat particles in the water greater than 5 microns are filtered out. A suitable filter is available from Ametek, Sheboygen, Wis. The filter housing is available under the trade designation Ametek #10 and is of a clear plastic material. The filter is an Ametek #10 filter −5 micron. Such a filter will filter out most visible particles from the incoming fresh water. This filtration of the incoming fresh water is provided so as to ensure that dirt and dust or rust particles are removed whereby a better quality water is provided to the system. Otherwise, such particles would show up in the photofinishing operation resulting in spots or impurities on the photographic film.

The filtered fresh water is then passed through a deionizing or demineralization unit 16 wherein dissolved mineral contaminants are removed. The demineralization unit comprises, in general, a vertically disposed housing loaded with an ion exchange resin, later more fully disclosed. The mineral contaminants are usually present in ionized form, in the incoming fresh water. The result is, of course, a "softer" water. The removal of such dissolved contaminants is highly desired, in addition to the filtering out of visible particles greater than 5 microns for two reasons. First of all, the removal of these dissolved contaminants results in less streaking on the film. Perhaps of even more importance, however, is that such contaminants will not pass through to the silver extraction resin, hereinafter more fully disclosed. Thus, the silver thiosulfate and thiosulfate ions in the photowash water will not be competing with other dissolved ions, i.e., the mineral contaminants coming into the fresh water, for a resin site. As a result, the ability of the silver extracting resin to extract silver from the waste water is prolonged, as it will not extract other free ions in the wash water.

Various conventional ion exchange resins can be used in unit 16, provided they accomplish the intended purpose as set forth above. One such deionizing resin which will be found suitable for use in removing dissolved minerals from the incoming fresh water is a mixed bed resin available commercially from Matt-Son Company, Barrington, Ill. The housing containing the mixed bed resin is desirably a clear 10" plastic housing (Ametek #10) the same as is the filter housing earlier disclosed. The demineralization resin is loaded into the housing in such a manner that the incoming fresh water flows upwardly through the resin bed.

The incoming fresh water being discharged from the mixed resin bed of the deionizing unit 16 is then passed through a water level control valve 18 to the collection tank 12, the purpose for which will soon be made clear. Collection tank 12 should be of plastic or stainless steel due to the corrosive nature of the wash water from the photoprocessing operation. Nevertheless, in small scale photofinishing operations a tank capable of holding 15 gallons liquid will be found quite satisfactory, particularly where the processor's wash water tank holds about 10–20 gallons. This combination has been found to allow the silver extracting resin unit, later more fully disclosed, to remove the silver thiosulfate quite effectively. With a smaller tank, the thiosulfate levels may get too high and since such compete with the silver thiosulfate ions for resin sites, the efficiency of the silver extracting resin will be greatly reduced.

Although not shown in the drawing (FIGS. 1 and 2) for sake of clarity, the wash water collection tank 12 is generally provided with a removable cover. This will reduce the possibility of airborne dust and particles from getting into the wash water. Such particles tend to clog the 5 micron filter 20, later more fully disclosed. Also, without a cover, the wash water is exposed to existing light, which is to be avoided. Light tends to aid biological growth which is undesired.

Although in FIG. 1 of the drawing, the level control valve 18 is shown outside collection tank 12, it will be appreciated that such is actually connected to the discharge end of the conduit 22 for the fresh or make-up water. Thus, valve 18 is located in the wash water 24 in collection tank 12 and is caused to open according to conventional technique for the addition of fresh water to the collection tank at predetermined intervals. The level control valve 18 is a conventional liquid level control valve. Various such valves commonly used may be used for this purpose provided they can withstand the corrosive nature of the photofinishing wash water. A valve that will be found suitable in this system is commercially available from Hudson Valve Company of Bakersfield, Calif. The control valve 18 is provided with an inlet fitting (not shown) measuring 1 inch, suitable for connection to the incoming fresh water line 22, a conventional garden hose available from Greene Rubber Company. All fittings are schedule 40 or 80 PVC. Such are advantageously used in the silver recovery/recirculation system of this invention, due to the corrosive nature of a darkroom in a photoprocessing operation.

The wash water is pumped from collection tank 12 by means of pump 26 to a silver recovery means designated generally by reference numeral 28. Silver recovery means 28 comprises two vertically disposed units which comprise two vertically disposed housings 30, 32 which contain resin containing cartridges 34, 36 respectfully. Housings 30, 32 are of clear plastic and available from Ametek, as were the earlier housings disclosed, under the trade designation Ametek #10. Each housing is 10"tall and has a diameter of 4 inches. The cartridges 34, 36 are available commercially from Hydro-Flow Filtration Systems, Inc. of Corona, Calif. under the trade designation UNI-DYNAFLOW. Nevertheless, other cartridges may be found suitable in the practice of the invention provided such is of a material, e.g., plastic or stainless steel, that can withstand the corrosive nature of the wash water 24. The size of such cartridges, moreover, can vary somewhat, depending upon the amount of resin needed to accomplish the desired silver recovery, and, of course, the size housing being used.

Each of the cartridges 34, 36 has the capacity of about 0.9 of a liter and each contains that amount of an ion exchange resin capable of recovering silver from the wash water solution. Actually, as is well known by those skilled in the art, the wash water solution 24 contains dissolved ions of a complex salt of silver thiosulfate, and thiosulfate ions. A number of commercially available ion exchange resins may be found useful in the system disclosed herein for extraction of silver from the wash water. An example of such resins that are commercially available are sold under the trade names Rohm & Haas 458 and Rohm & Haas 400 and are available from Rohm & Haas Co. of Philadelphia, Pa. Another resin for silver extraction is available from Purolite, Bala Cynwyd, Pa. under the trade designation Purolite A-600. The ion exchange resins are loaded into the cartridges 34, 36, in predetermined amount (0.9 liter volume) from time-to-time, as needed.

Figure 3:
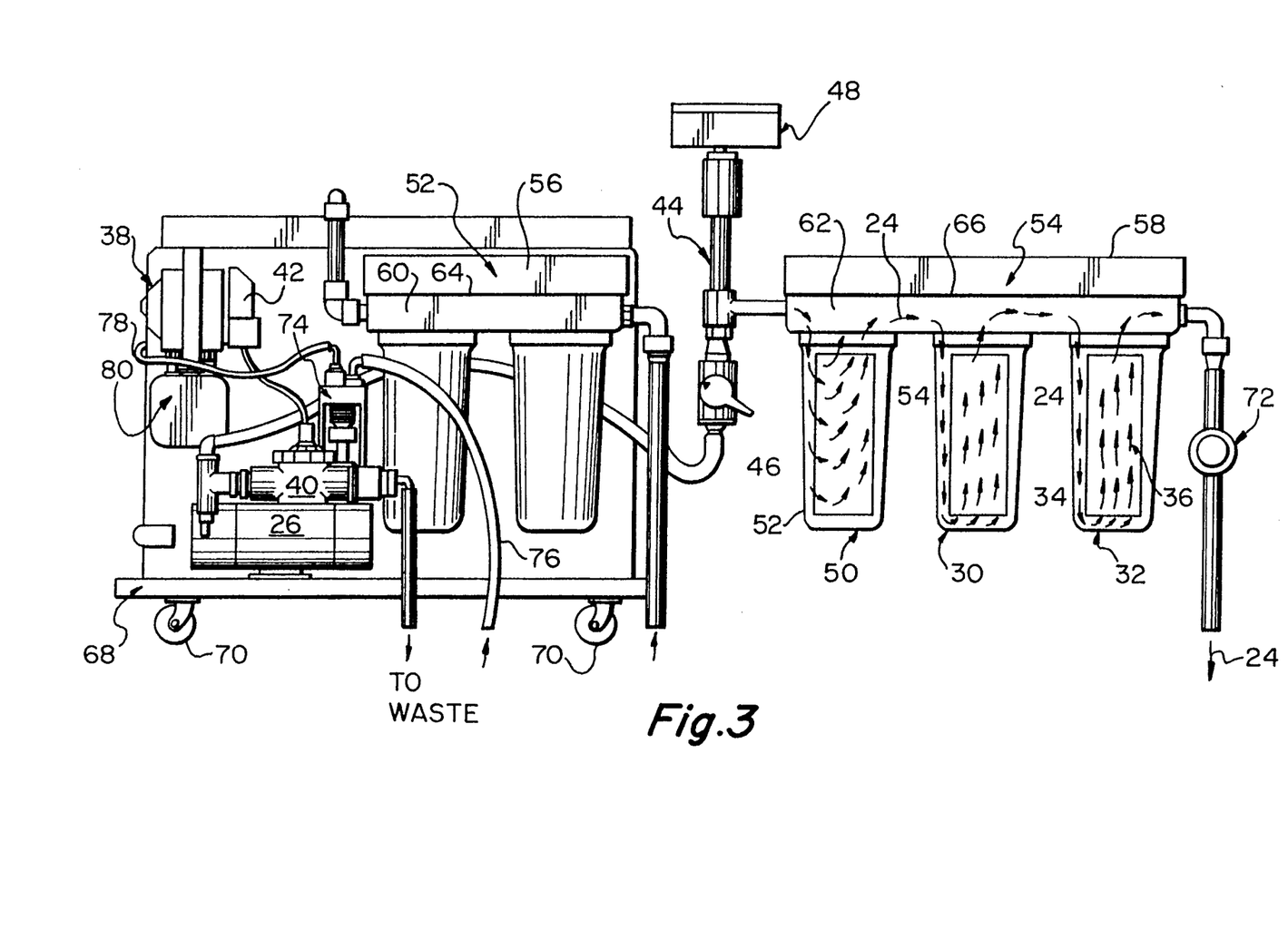
FIG. 3 is a front view of the recirculation apparatus shown in FIG. 2 showing the pressure control system in the conduit to the silver recovery system and showing that system disconnected from the collection tank for the wash water solutions for better showing of how the wash water flows through that system and is recirculated to the photoprocessing operation.

The flow of the wash water 24 i.e. the wash water from collection tank 12, is into the top of the housings 30, 32, as shown more clearly in FIG. 3. Thus, as will be appreciated from that figure of the drawing, the wash water 24 flows to the bottom of the housing containing the ion exchange resin loaded cartridge whereby it then is caused to flow upwardly through the bed of ion exchange resin and out the top thereof, and the housing containing the cartridge. Thus, any air in the wash water is allowed to rise to the top surface of the resin bed. The effluent discharged from the second housing 32 containing the ion exchange resin cartridge 36 is recirculated back to the photofinishing operation 10, as will be best appreciated by reference to FIG. 1. Thus, there is provided a closed system except for periodic flow of fresh water into the system and discharge from the system of a like amount of wash water, as hereinafter disclosed.

The wash water 24 is pumped from the collection tank 12 to the silver recovery means 28 by a pump 26, a continuous duty pump, i.e., one capable of being constantly in operation, if desired. The pump should be capable of operation as long as the photofinishing operation is in operation. Importantly, whatever pump is used must provide a sufficient amount of pressure to pump the wash water through the resin cartridges 34, 36. Accordingly, pump 26 needs to be a low flow, high "head" pump. The IWAKI, MD-30-RLZT-115, available from Iwaki/Walchem of Holliston, Mass. will be found quite effective for use in the practice of this invention.

In some cases, the silver recovery wash water recirculation system may be in operation continuously, i.e., 24 hours a day. Nevertheless, with most uses by small scale photofinishing operators of the system disclosed herein, the use will be intermittent. In general, the operator will merely turn the system on in the morning by means of a conventional switch designated generally by reference numeral 38. This electrical switch must be water resistant and various of such switches are known and commercially available. One such switch having a water resistant housing is available from Carlon Mfg. of Forestville, Md. Once turned on by the operator, the recirculation system operates automatically, as hereinafter more fully discussed, discharging a predetermined amount of wash water 24 from collection tank 12 to waste, e.g., into a sewer.

The silver concentration in the wash water discharged to waste may vary somewhat as hereinafter described. Whether any silver is present in the wash water discharged to waste and the amount thereof depends upon a number of considerations. These include, as will be appreciated by those skilled in the art, the length of time the silver recovery resin has been used, the particular ion exchange resin used, the time of day the wash water is discharged relative to the film being processed, etc. With respect to the last named factor, for example, if a newspaper's active processing time is 10:00 AM and it discharges waste water at 10:15 AM, some silver may be in the wash water discharged. Nevertheless, if that same film processor waits awhile, e.g. until 1:00 PM, before discharging wash water to waste, this gives the wash water a chance to be recirculated through the system sufficiently and the silver to be extracted by the silver recovery resins. The silver concentration in the wash water discharged, however, can readily be reduced to acceptable environmental levels using the silver recovery/recirculation system of this invention, e.g., down as low as 0.01 ppm.

The discharge of wash water from pump 26 to waste periodically, as later more fully disclosed, is through a conventional solenoid valve 40, e.g. Solenoid Valve Model 2400 available from Richdel Comp., Nevada City, Nev. This valve can be operated to open whereby to discharge wash water from the collection tank 12, based upon some desired time sequence. Thus, a certain predetermined amount of wash water can be discharged from time-to-time to waste, e.g., a sewer or drum for off-site disposal, as desired. As shown in FIG. 3 of the drawing, the solenoid valve 40 is connected, according to usual technique, to a timer designated generally by reference numeral 42. A suitable timer is available under the trade designation Timer DTI from Intermatic, Spring Grove, Ill. Nevertheless, other timers can be used provided such is capable of holding timing memory when power to the entire system is switched off. Any timer to be used should have the capability of four (4) or more on/off cycle modes.

When timer 42 turns on, the solenoid valve 40 is opened. This results in wash water 24 from collection tank 12 being pumped to waste, i.e., to a sewer or drum, via pump 26. As the wash water is being pumped to waste, the liquid level valve 18 senses that the water level in tank 12 has dropped. Thus, this valve opens allowing fresh water to be introduced by regular city water pressure. When the predetermined level in the collection tank is again reached the flow of incoming fresh water ceases.

The wash water 24 is pumped from the collection tank 12 via pump 26 to the silver recovery system 28 through a conventional flow rate control means designated generally by reference numeral 44 which comprises a flow rate control valve 46 and pressure gauge 48. A suitable valve is available commercially from Asakhi of Japan and is known as a Labcock Valve. Other valves can, of course, be used instead, if desired. The only requirement is that such be capable of handling the corrosive wash water and be suitable for controlling the desired relatively low flow rates of the system. A suitable pressure gauge 48 is available from Ametek, U.S. Gauge Division, of Sellersville, Pa. The purpose of the Labcock valve and pressure gauge is to alert the operator as to a possible flow problem. When the system is first started up and the Labcock valve is fully open, the pressure gauge (indicates readings from 0–30 psi), from my testing, will read about 14 psi. The flow rate at 14 psi has been determined to be about 1–2 gallons per minute (GPM). If the valve is fully closed, and flow stopped the pressure reading will be about 16.5 psi.

In many cases, however, a flow rate of 1–2 GPM will be unnecessary. By partially closing the valve, the flow rate will drop to about 0.5–1.5 GPM, at a gauge pressure of 5–10 psi. At whatever the flow rate, as the 5 micron filter cartridge 54 starts to become blocked with particles, the pressure gauge reading will increase. Thus, the operator will have a visual indication of when to change the 5 micron filter. It should be noted, however, that if the 5 micron filter is changed and the pressure reading remains high, the problem may have been caused with a clogged resin cartridge or there may be another problem. Nevertheless, the pressure gauge is an "alarm," so-to-speak, that a flow problem exists. With such a warning, the problem can be corrected before it affects film quality or causes harm to the environment.

As best shown in FIG. 3, the wash water 24 is passed through the flow rate control valve 46 discharging into the top of filter unit 50 comprising a clear filter housing 52 and a filter cartridge 54. This filter unit is the same as filter unit 14 and is used to filter out solids greater than 5 microns from the wash water being discharged into the bed 34 of resin in the first silver recovery unit of the silver recovery means 28.

Each of the filter units, i.e., filter unit 14 and filter unit 50, comprises a clear housing, as earlier described, the same as those housings used in the silver recovery units earlier disclosed. The same type clear housing is also used in the demineralization unit 16. Thus, conveniently, and quite advantageously, the same type and size housings can be used in all the various treatments of the incoming fresh water and wash water streams. This not only enables a silver recovery/wash water recirculation apparatus according to the invention to be of relatively simple, economical construction but also to be built in a compact manner such as is shown in FIG. 2.

Figure 2:
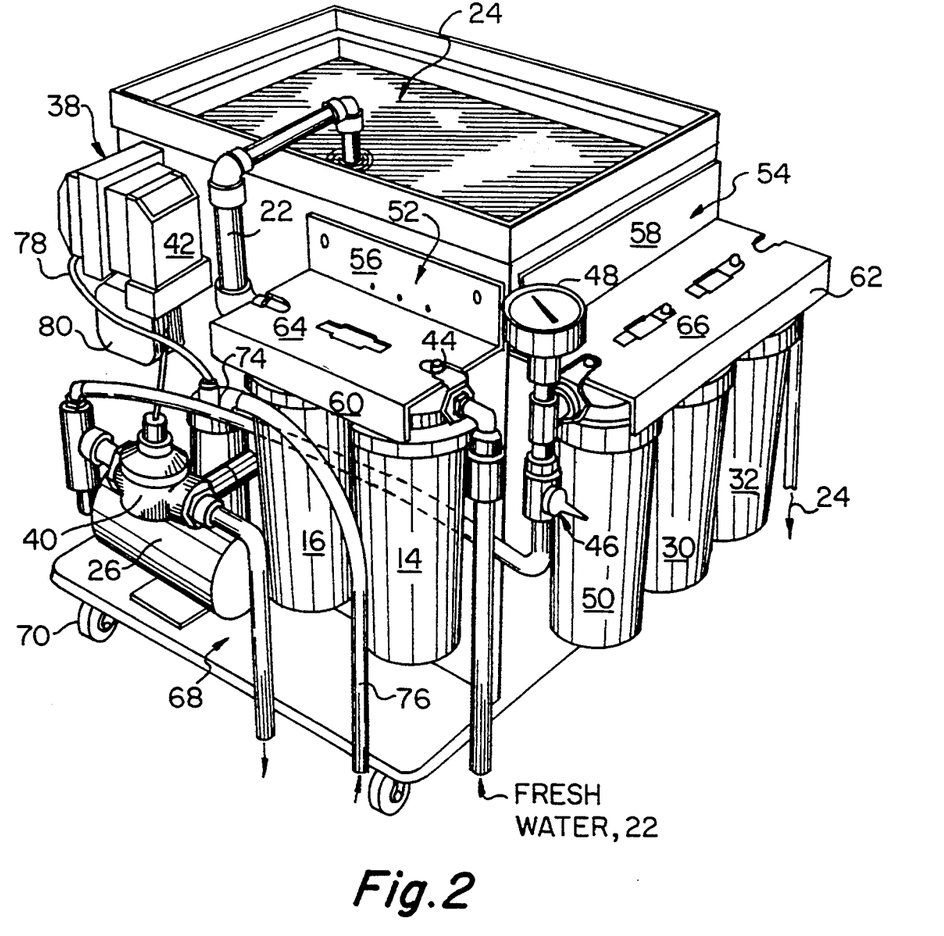
FIG. 2 is a view in perspective of an apparatus combination according to the invention used in the silver recovery and recirculatory wash water system.

By reference to FIG. 2, it will be seen that the various housings are attached to the wash water collection tank 12 by bracketing means 52, 54. These brackets are of similar constructions each having vertically disposed members 56, 58, 60, 62 and horizontally disposed members 64, 66, respectively. The brackets are attached to the sides of collection tank 12, according to conventional techniques, by vertically disposed members 56, 58. As will be best appreciated by reference to FIG. 2, it will be seen that vertically disposed members 60, 62 serve to hide the connections of the housings to the conduit at their respective screw-on tops. The housings, though not shown, are connected to the horizontally disposed members 64, 66, according to conventional techniques.

Although the various housings disclosed herein for the various treatment means for the incoming fresh water and photo wash water are shown to be attached to the collection tank 12, this need not necessarily be the case. These housings can, if desired, all be connected to a support member (not shown) located vertically directly above the collection tank 12. Or, the housings can be located on a support member wherever desired for sake of convenience or suitable space available. Nevertheless, wherever the housings are located, the flow of fresh city (or makeup) water or wash water through each water treatment unit will be the same as if the cartridges are attached to the collection tank 12, as shown in FIG. 3. The more preferred wash water silver recovery/recirculation system will have all the various components thereof attached to the collection tank 12 or to a base 68 on which the collection tank 12 is supported. This will provide the smallest foot print for the total system and require much less piping to connect together the various components comprising the wash water recirculation and silver recovery system of the invention. The base or supporting member 68, moreover, is preferably supported by rollers such as shown by reference numeral 70. Thus, the silver recovery and wash water recirculation system of the invention is readily movable to any location, as desired by the film processor. This portability makes the system more readily connectable to the film processing unit and therefore makes best use of space available.

Although not shown in the drawings, the on-off switch, and timers can all be located together on a console attached to the collection tank 12, if desired. Or the console can be located off the collection tank elsewhere, as desired by the processor. The providing of such a cansole is well within the skill of the art.

As will be seen by reference to FIGS. 1 and 3, the wash water effluent from the silver recovery unit 28 is returned to the wash water tank in the film processor 10. In most cases, the end of the conduit discharging treated wash water into the film processor wash water tank will actually be located in the wash water in that tank. Thus, it generally is desirable to provide in that conduit connecting the silver recovery unit and the photoprocessor a check valve designated generally by reference numeral 72 (FIG.3). Otherwise, the wash water processor tank could drain back into the silver recovery system, hence to the wash water collection tank 12. A check valve most suitable to prevent such an occurrence should desirably provide a relatively low back pressure. One such valve that will be found quite suitable in the practice of this invention is available from George Fisher Signet, Inc. of Schaffhausen, Switzerland.

Connected to the collection tank 12 is a biocide pump designated generally by reference numeral 74 (FIG. 3). The biocide pump is connected by appropriate conduit 76 to a container for the biocide (not shown). The biocide is metered by the pump into the wash water in collection tank 12 through conduit 78. The pump used is a conventional metering pump available from Gorman—Rupp of Bellville, Ohio and is known in the trade as a mini-bellows pump. Other metering pumps can, of course, be used provided they meet the characteristics of the pump 74. This pump must be capable of being set to pump low quantities of biocide daily into the wash water in collection tank 12. The pump used in the practice of the invention need have all plastic and rubber contacts due to the corrosive nature of the biocide. Its valves need prevent backflow of the liquid once the pump is off. The pump should be self priming so that the process operator does not have to be concerned with contact with the biocide to operate it. The metering pump 74 is connected (not shown for sake of clarity) according to usual techniques to a conventional timer located inside housing 80. A suitable timer is available from Syralac Corp., Dallas, Tex. under the trade designation SE BDRU 110. This timer includes a priming means for the biocide pump.

Although the biocide pump 74 is shown attached to collection tank 12, it will be appreciated that such need not necessarily be the case. This pump, however, is preferably located on platform 68 or directly attached, according to conventional manner, to the outside surface of the collection tank in convenient location, the same as is switch 38 and timer 42.

Various biocides can be used in the practice of the invention provided they eliminate, or at lease inhibit, the growth of microorganisms, in the wash water solutions to the extent desired. A biocide that will be found quite useful in controlling biogrowth in photowash water solutions is available from WR Grace of Lake Geneva, Ill. under the trade designation Dearcide 702. This biocide is discharged into the wash water 24 contained in the collection tank 12 at the rate of only one (1) ounce per day. Such is accomplished automatically without need of operator interference during the operation of the recirculation system. The timer is provided with a printed circuit board by the pump manufacturer according to the flow specifications given.

After installation of the recirculation system of this invention, in which a closed loop is provided with the photo finishing operations, the collection tank 12 will first be filled with 15 gallons fresh water generally heated to about 70 degrees Fahrenheit. When the collection tank 12 is filled to the desired level, the level control valve 18 will automatically be shut off, preventing further flow of fresh water into the tank. The recirculation system is then caused to operate the pump 26 whereby the water is pumped through control valve 46, then through the filter unit 50 and the silver recovery system 28, the flow being as best shown in FIG. 3. The effluent from the silver recovery system 28 is recycled then back to the photofinishing operation wash water tank. At the same time, untreated wash water is allowed to flow into the collection tank 12 from the photofinishing operation. This wash water mixes with the fresh water then contained in the tank. Thus, as recirculation progresses wash water from the photofinishing operation replaces that being pumped from the collection tank 12 to the silver recovery system 28. In some cases, the wash water may need be pumped from the photofinishing operations if gravity flow is not possible.

As the washing down or rinsing in the photofinishing processing units continues, the wash water solutions or rinse effluent will be passed to the collection tank 12. At the same time wash water is pumped from the collection tank 12 to the silver recovery means. The flow rate of water discharged is maintained comparable to the flow rate of wash water into the collection tank 12 whereby to maintain a predetermined volume of wash water in the tank. Periodically wash water 24 is discharged to waste through solenoid valve 40, as best seen in FIG. 3. When wash water is discharged to waste, the wash water level in tank 12 drops, as earlier disclosed. Valve 18 is a conventional mechanical liquid level valve with a float. As the level of wash water drops, the valve is caused to open allowing fresh water to flow into the collection tank. When the amount of fresh water introduced into tank 12 raises the float to the predetermined level, the valve closes. No further fresh water is introduced into the tank. The amount of fresh water introduced is equal to the amount of wash water discharged to waste.

As will be appreciated by those skilled in the art, this manner of introduction of fresh into collection tank 12 water tends to reduce the concentration of thiosulfate ions in the wash water. As a result, fewer of such ions are available for competition with the silver thiosulfate ions for sites on the ion exchange resin in the silver recovery system. Thus, the silver recovery system operates somewhat more effectively to extract silver from the wash This flushing of the wash water only occurs, generally, from 1 to 4 times a day. This will depend upon several considerations, film being processed, and archival water quality needs. In general, the greater the amount of fresh water introduced into the collection tank, the better the quality of wash water being recirculated. The opening of solenoid valve 40 is controlled and determined by timer 42. When the wash water is discharged at the rate of 3 gallons per minute satisfactory results will be obtained with the system more specifically disclosed herein. Accordingly, it is highly desired that the timer 42 operate to maintain the solenoid valve open for three minutes, whereby 9 gallons of wash water is discharged to waste with each opening of the solenoid valve. Quite advantageously, when the solenoid valve opens, the wash water 24 being pumped from the collection tank 12 will be diverted through the solenoid valve 40 to waste due to the back pressure of the resins in the silver recovery system 28. The path of least resistance to the flow of the wash water from pump 26 is through the open solenoid valve.

As will be appreciated by those skilled in the art, there are silver ions thiosulfate always in the wash water in collection tank 12. Nevertheless, the level of the silver ions thiosulfate never raises very high (say over 3 ppm silver) unless: (1). The silver recovery resin is exhausted and cannot absorb any more silver; or (2). The circular flow pattern is so slow that the silver accumulates in tank 12 prior to the wash water being treated by the silver recovery system. When that point is reached, however, the silver concentration in the wash water then begins to rise. Accordingly, if fresh water is not introduced into the system the silver concentration in the wash water will continue to rise to an unacceptable level. Perhaps even more importantly, however, thiosulfate also will rise to an unacceptable level. Thus, in accordance with the invention, however, and this is a critical feature thereof, fresh water will be periodically introduced into the collection tank at the same time that wash water is discharged to waste. This is done to maintain a constant level in the collection tank 12, but also to reduce the thiosulfate level in the wash water as earlier disclosed.

The amount of silver that can be absorbed by the ion exchange resin in the silver recovery system will depend to some extent upon the particular resin used and the volume of the resin bed. In the silver recovery system 28 disclosed herein, the amount resin in each housing is 0.9 liter. Accordingly, it has been determined that with this amount and the resins used, the resins can absorb as much as about 23,000 milligrams of silver before the resin bed is exhausted. Thus, a silver recovery cartridge is good for about one (1) month operation for the average small to large newspaper printer. For an individual user to get an exact time when to change the silver recovery resins, the wash water will need be evaluated in an atomic absorption spectrophotometer to test to parts per million. This need not necessarily be done more than once or twice for a user to establish an actual time frame for change of the resin cartridges. The resin cartridges are considerably cheaper than having such a test conducted, e.g., monthly. Accordingly once a time frame is established by a user through one or two tests, the better practice may be for the user just to change cartridges monthly, or whatever the time frame established, rather than to have atomic absorption tests performed periodically.

As earlier disclosed, it is highly desirable that the thiosulfate be maintained below a certain level in the wash water. This is to provide greater effectiveness in extracting silver from the wash water. In general, for the silver recovery resins to be most effective, a ratio of 20 gallons of water to one liter of thiosulfate should be maintained. This level thiosulfate (96–135 liters: 1) can be maintained, it has been determined, with a 15 gallon tank of wash water plus the 10–20 gallons of wash water in the wash water tanks in the photoprocessor operation, with the periodic discharge of wash water from the collection tank and the addition of a like amount of fresh water thereto, as above disclosed.

The amount of fresh water to be introduced into the collection tank, and over what period of time, or how often can vary somewhat, depending upon the square feet of film being processed and the user's concern with the archival quality of the photographic film/paper. For example, medical x-rays must be kept for 5–7 years. If too much thiosulfate is left on the film surface that x-ray's quality can deteriorate to an unacceptable level. To control this situation, fresh water is introduced into the wash water according to one aspect of the invention. As a result, the silver thiosulfate and thiosulfate removing resin are found to work well in maintaining archival quality. With the size silver recovery/recirculation system found most practical for small scale users, I have found that fresh water should be added to the collection tank 12 in an amount of 9 gallons fresh water per 15 gallons wash water to reduce the thiosulfate in the wash water to the desired level and to maintain it at that level. The most optimum level of thiosulfate in the wash water will depend upon a number of factors, as earlier disclosed. Nevertheless, it has been discovered that in the system disclosed in the invention herein, a thiosulfate level of 96–135 liters wash water to 1 liter thiosulfate will provide quite adequate results. This fresh water addition can best be spread out over the course of the days operation, e.g., 3 gals. fresh water is added to the collection tank 12 up to four times a day. Thus, the timer 42 must be capable of activating the solenoid valve four times a day whereby the same amount of wash water is discharged from the collection tank 12 to waste as is added to the tank by the fresh make-up water. Nevertheless, the user has several options to operate the system of the invention. The user can be, for example, concerned with silver discharge levels, water consumption, archival quality, or general wash water quality (i.e. clean water that gives good imaging on the film or paper).

By pumping out some process wash water and replacing it with fresh water the user has the option of controlling these factors according to his needs and objectives. If the user wants very low silver discharge and archival quality, the water should be changed 4 times a day removing 12 gallons per discharge. If the negative is to be used only once and discarded and water quality is of minor import, the user may wish to change the water only once a day removing only 3 gallons.

The timer 42 activates the solenoid valve only. The pump 26 is operating regardless of whether the solenoid valve is open or closed. When the solenoid is closed the water flows only to the filter and silver resin housings. When the solenoid opens the water continues to flow to the filter and silver resin housings but because of the resistance inherent to the resin bed, more water flows to the drain.

As recirculation continues, biocide is intermittently squirted into the collection tank. The amount required to control build-up of bacterial slimes, etc. in the system will be determined, in part, by the particular biocide used. I have discovered that Dearcide 702 is quite effective in the practice of the invention. The manufacturer, WR Grace, has determined that water should contain 40 ppm Dearcide 702 to maintain control on algae growth. By discharging wash water 1–4 times a day and injecting ½ ounce biocide every 11 hours this 40 ppm level is maintained.

The major advantage of automatic injection of the biocide is that the user does not need to interact with the system daily or react after biosliming has occurred. By contrast CPAC of Leicester makes a biocide packet which is placed in a conventional wash water recirculator to control biogrowth. The manufacturer asks the user to add new packets "every 3–4 days or when biogrowth starts to appear." Once growth starts, however, it is too late. The user must stop all work and clean and remove all growth from the equipment.

The silver in the wash water from collection tank 12 is recovered primarily by the first ion exchange resin bed, i.e., that in cartridge 34. The second silver recovery unit 32 is primarily a back-up unit. Nevertheless, some silver is extracted from the effluent from the first silver recovery cartridge. Based upon experience, in the case of a small user, the ion exchange resin in silver recovery unit 34 will be loaded, and need be replaced with a new unit about once a month. Nevertheless, this can vary somewhat, dependant upon the particular resin used. The resins each have a certain capacity to absorb silver. As a resin bed moves toward its saturation level, i.e., most of the sites on the resin particles are occupied, some silver ions in the wash water may not be caught. The point at which the ion exchange resin point changes from complete capturing of the silver ions to only partial recovery is called the break through point. The resin beads still may have sites available and are still absorbing many silver thiosulfate ions but some ions are not being caught. By having a second silver resin cartridge, e.g. silver resin unit 32, the second cartridge acts to "catch" those missed ions. The important factor here, I have discovered, is that because the solution is constantly being recirculated the cartridges do not have to be in sequence of older first, new cartridge second.

A loaded silver resin cartridge is replaced by merely unscrewing the clear housing from its top and removing the loaded cartridge, replacing it with a fresh one. On removing such, the ion exchange unit will need be shut down only for a very short time. The second resin cartridge remains in place until the following month. Then, the "second" silver recovery unit is replaced with a new cartridge and the "first" unit (unit 30) remains in place. Thus, the user alternates changing the cartridge in only one of the silver recovery units each month.

Although the resin can be regenerated with a 2% sodium chloride solution, the relative inexpensive cost of the resin in the cartridge format makes regeneration disadvantageous. Secondly, regeneration requires controlled conditions and a skilled practitioner which could out weigh the cost of new resins. Thirdly, if regeneration is not properly done and silver is released to the environment severe fines and penalties could result. Fourthly, many states and localities require that the regeneration process be a licensed or regulated activity even for small (less than 1 gallon) quantities of silver bearing liquid. For these and other reasons regeneration is not worthwhile.

It will be appreciated by those skilled in the art that the collection tank can be larger if desired. It need not be of a cubic shape. Instead, the collection tank can be of a cylindrical shape, if desired .

Another embodiment of the invention allows for an additional silver recovery unit, like that disclosed earlier herein, to be located in the discharge to waste from solenoid valve 40. This unit will provide two advantages. Firstly, any possible silver thiosulfate missed by the silver recovery system 28 would be caught by this "tailing" resin cartridge. This could be very important in geographical areas where environmental requirements are constantly monitored and illegal discharges of silver are severely penalized. Secondly, in some film processors, the wash water is "sprayed" on the film rather than the film being passed through a wash bath or tank. During the 3 or so minutes that the solenoid is open, in such an operation, to discharge wash water to waste, this could possibly result in the spray bar losing so much pressure that the film is not washed for those few minutes. The tailing cartridge ensures against such loss in pressure as it creates a back pressure against the discharge flow. Because the back pressure created by filter unit 50 and the silver recovery units 30, 32 is greater than that created by the "tailing" cartridge, the spray bar will continue to spray wash water, while the wash water is still being discharged.

Other modifications and changes, as will be understood, can be made in the invention and its form and construction without departing from the spirit and scope whereof. The embodiments disclosed herein are merely exemplary of the various modifications that the invention can take and the preferred practice thereof. It is not, however, desired to confine the invention to the exact construction and features shown and described herein, but it is desired to include all such as properly come within the spirit and scope of the invention disclosed.

What I claim is:

1. Apparatus for automatically reducing the concentration of silver in the wash water effluent from a film processing system and recirculating a predetermined amount of wash water back to the film processing system providing a closed loop system comprising, in combination:

(a) a collection tank in operative association with the wash water tank of a film processing system for the receiving and holding of a predetermined amount of wash water effluent from said film processing system mixed with a predetermined amount of fresh water;

(b) means associated with the collection tank for periodically providing a predetermined amount of fresh water into the collection tank to be mixed with the wash water effluent from the film processing system;

(c) means for pumping a predetermined amount of wash water mixed with fresh water from the collection tank to a silver recovery means and for recirculation of the wash water effluent from the silver recovery means back to the wash water tank in the film processing system;

(d) means for recovering silver from the wash water and fresh water mixture discharged from the collection tank; and (e) means for periodically and simultaneoasly causing an amount of wash water mixed with fresh water equivalent to the amount of fresh water provided to the collection tank to be diverted from the silver recovery means and pumped from the collection tank to waste.

2. Apparatus according to claim 1 further comprising filtration means located between said collection tank and the fresh water means for filtering out solids from the incoming fresh water of a predetermined maximum size.

3. Apparatus according to claim 2 wherein said apparatus further comprises means containing a deionizing resin located downstream from said filtration means for solids and prior to the collection tank whereby the filtered fresh water is further treated to remove various water hardening minerals from the incoming fresh water.

4. Apparatus according to claim 3 wherein the apparatus further comprises means provided in operative association with the collection tank for introduction of a predetermined amount of a biocide into the wash water/fresh water mixture in the collection tank at predetermined time intervals whereby to inhibit the growth of microorganisms in the closed loop system.

5. Apparatus according to claim 4 wherein the means for recovery of silver from the wash water and fresh water mixture comprises a first means comprising an ion exchange resin.

6. Apparatus according to claim 5 wherein the silver recovery means comprises a second means for recovery of silver comprising an ion exchange resin.

7. Apparatus according to claim 6 wherein filtration means is located prior to the first ion exchange resin means in the silver recovery system for removal of solids of a predetermined size from the wash water/fresh water mixture from the collection tank.

8. Apparatus according to claim 7 further comprising means to maintain the level of the wash water/fresh water mixture in the collection tank at a predetermined level whereby when said means causing a predetermined amount of the wash water/fresh water mixture periodically to be pumped to waste, said level control means allows a like volume of fresh water to flow into the collection tank.

9. Apparatus according to claim 4 wherein the first and second means each for silver recovery each comprises an elongated vertically disposed cartridge loaded with the ion exchange resin and a housing for the ion exchange resin cartridge whereby the said mixture of wash water and fresh water introduced into the housing is caused to flow upwardly through the ion exchange resin and out the top of the ion exchange resin in each said cartridge so that any air in said wash water and fresh water mixture is allowed to rise to the top of the resin contained in the cartridge.

10. Apparatus according to claim 9 wherein the means for pumping the wash water mixture to the silver recovery system is a low flow, high head pump whereby sufficient pressure is provided to pump the wash water and fresh water mixture through the ion exchange resin cartridges.

11. Apparatus according to claim 10 wherein the apparatus further comprises a check valve located between the silver recovery means and the wash water tank of the film processing system whereby to prevent the wash water in the wash water tank in the film processing system from draining back into the silver recovery means.

12. Apparatus according to claim 11 wherein the collection tank is capable of holding 15 gallons of the wash water/fresh water mixture and the wash water tank in the film processing system is capable of holding from about 10–20 gallons of the mixture.

13. Apparatus according to claim 1 wherein the collection tank is defined by an open top end and a removable cover is provided on the top end whereby to prevent air borne dust and particles from getting into the wash water and fresh water mixture and to prevent the wash water mixture from exposure to light.

14. Apparatus according to claim 1 further comprising a horizontally disposed supporting member and said means associated with the collection tank for providing fresh water, said means for pumping the wash water/fresh water mixture to a silver recovery means and said means for pumping the water mixture to waste are all provided on the supporting member in a closely associated compact manner whereby to provide the smallest footprint for the apparatus.

15. Apparatus according to claim 14 further comprising a plurality of rollers mounted to and supporting the horizontally disposed supporting member whereby the apparatus is made portable.

16. Apparatus according to claim 1 wherein the apparatus comprises a second silver recovery system and such a system is located operatively with the means causing the wash water/fresh water mixture to be pumped to waste whereby silver can be recovered from the discharge to waste.

17. Apparatus according to claim 1 wherein the apparatus further comprises means for alternately discharging a predetermined amount of the mixture to waste and a predetermined amount to the silver recovery means.

18. Apparatus according to claim 7 wherein the means for alternately discharging the wash water mixture to a silver recovery means and to waste is a solenoid valve capable of being operated upon a desired time sequence.

19. Portable apparatus suitable for providing a closed loop with a the wash water tank of a film processing system for automatically reducing the concentration of silver in the wash water effluent from the wash water tank of the film processing system and for reducing the amount of fresh water used in the film processing system comprising in combination:

(a) a collection tank for the holding of a predetermined amount of wash water from the wash water tank of the film processing system and a predetermined amount of fresh water mixed therewith;

(b) means connected to the collection tank for pumping at timed intervals a predetermined amount of wash water mixed with fresh water from the collection tank to a silver recovery system and to cause the effluent from the silver recovery system to be recirculated back to the wash water tank in the film processing system;

(c) a silver recovery system for extraction of silver from the wash water mixture being pumped from the collection tank to the silver recovery system whereby silver can be recovered;

(d) filtration means associated with the silver recovery system and located prior thereto for filtering out solids from the wash water mixture greater than a predetermined size;

(e) means associated with the means for the pumping of the wash water and fresh water mixture from the collection tank for periodically dumping a predetermined amount of the wash water and fresh water mixture to waste;

(f) means associated with the collection tank for providing fresh water to the collection tank whereby to replace the amount of the mixture of wash water and fresh water discharged from the collection tank to waste and to maintain the level of the wash water and fresh water mixture in the collection tank at a predetermined level so that the predetermined amount of wash water mixed with fresh water desired in the collection tank is maintained;

(g) filtration means associated with the means providing fresh water to the collection tank for filtering out of the fresh water solids greater then a predetermined size;

(h) means located between the fresh water filtration means and the collection tank for extracting dissolved mineral from the incoming fresh water; and (i) means associated with said collection tank and a source of a biocide for pumping biocide into the wash water and fresh water mixture in said collection tank whereby the growth of microorganisms in the wash water is inhibited.

* * * * *